(No Model.)
H. J. WATTEYNE.
CIGAR MAKER'S GAGE.
No. 308,115. Patented Nov. 18, 1884.
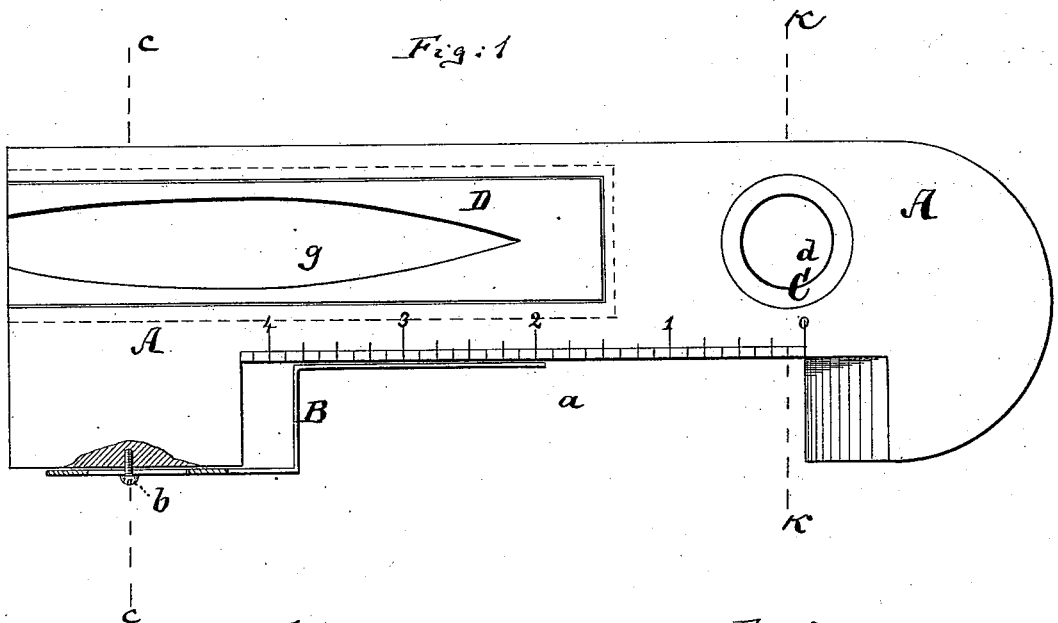
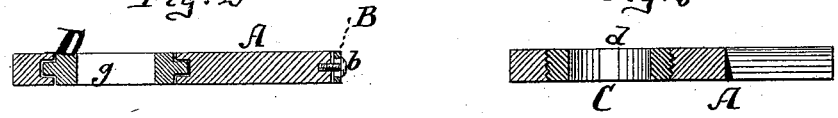
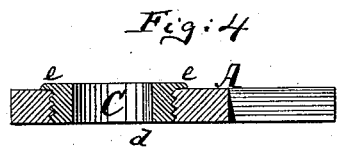
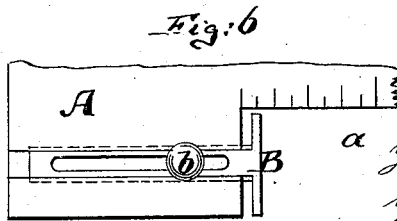
Witnesses:
Inventor
Henry J. Watteyne
by his attorneys
Briesen & Steele

UNITED STATES PATENT OFFICE.

HENRY J. WATTEYNE, OF NEW YORK, N. Y.

CIGAR-MAKER'S GAGE.

SPECIFICATION forming part of Letters Patent No. 308,115, dated November 18, 1884.

Application filed September 28, 1883. (No model.)

*To all whom it may concern:*

Be it known that I, HENRY J. WATTEYNE, a resident of the city of New York, in the county and State of New York, have invented an Improved Cigar-Maker's Gage, of which the following is a full, clear, and exact description, reference being made to the accompanying drawings, in which—

Figure 1 is a face view, partly in section, of my improved cigar-maker's gage. Fig. 2 is a cross-section on the plane of the line *c c*, Fig. 1. Fig. 3 is a cross-section on the plane of the line *k k*, Fig. 1. Fig. 4 is a cross-section on the same plane as Fig. 3, showing a modified construction of the movable annulus. Fig. 5 is an enlarged central section of one form of the movable annulus. Fig. 6 is a partial face view of a modified form of the adjustable stop used on the gage.

This invention relates to a gage used by cigar-makers for ascertaining the proper thickness, length, and form of each cigar made. To this end the gages heretofore in use were made each with a perforation to indicate the proper diameter of the cigar, and with a notch to indicate its proper length; but every such gage was applicable to one size of cigar only, and in order to make another size the operator had to use another gage, &c., it being, therefore necessary to have as many gages as there were different sizes of cigars to be made.

The object of my invention is to make one gage body or plate answer as a gage-holder for all sizes of cigars. To this end my invention consists, first, in providing the gage with a detachable annulus, and with means for arresting said annulus when inserted to the proper extent, so that it will be the guide for the thickness of the cigar, and at the same time firmly held in the body of the gage, and not liable to be tilted when a cigar is inserted.

The invention consists, secondly, in providing the gage at its notched portion with an adjustable stop, whereby the length of the notch may be varied and the gage adapted to cigars of different lengths.

The invention consists, thirdly, in supplying the gage with a detachable plate that has a hole of the shape of the cigar to be made cut out of it, all as hereinafter more fully described.

In the accompanying drawings, the letter A represents the body of the gage, the same being a board or plate of wood or other material, of the outline form shown in Fig. 1, and in cross-section of the size substantially indicated in Figs. 2 and 3. This gage has a notch, *a*, formed in one of its edges for determining the length of the cigar. The notch is bounded at one end by an adjustable stop, B, which may either be a bent strip of sheet metal of the form shown in Fig. 1, or a T-shaped plate of the form shown in Fig. 6, and which is attached by a screw, *b*, to the body A of the gage, as shown, said screw passing through a slot in the plate B. It will be seen that by adjusting this plate B, and refastening it in its several positions by means of the screw *b*, the length of the notch to be outlined in the making of any particular kind of cigar may be readily regulated. A scale—such as is indicated in Fig. 1—may be marked along the edge of this notch to show the length of the cigar. Thus in Fig. 1 the stop B is shown to be set for a cigar measuring three and three-quarters inches in length.

In the body of the gage A is a hole, *d*, which is threaded to receive a threaded annulus, C. This annulus is of such a size that its internal diameter will correspond with the greatest external diameter of the cigar to be made, so that when the annulus is in place in the gage A the operator, after having partly completed a cigar, will ascertain by passing it through the hole whether it has the proper maximum diameter. When the gage is to be fitted for thicker or thinner cigars, it is only necessary to put in another annulus of the proper size.

In order to enable the operator to put the annulus C into the gage A as far as required, when it will have its most perfect support therein, said annulus may either have a flange, as shown at *e* in Fig. 4, which, when it bears on the gage A, will prevent the annulus being screwed farther into said gage, or the annulus may be made slightly tapering, as indicated in Fig. 5, while the threaded opening in the gage itself would not be tapering—that is to say, the threads at the end *f* of the annulus, Fig. 5, would be so large in comparison with those in the gage that the annulus could not be screwed into the gage farther than is shown